United States Patent [19]

Hijii

[11] Patent Number: 5,748,886
[45] Date of Patent: May 5, 1998

[54] DATA CHECK METHOD FOR AN EXTERNAL MEMORY AND CHECK SYSTEM FOR AN EXTERNAL ROM DATA

[75] Inventor: Kazuyoshi Hijii, Tokyo, Japan

[73] Assignee: NEC Corporation, Tokyo, Japan

[21] Appl. No.: 641,532

[22] Filed: May 1, 1996

[30] Foreign Application Priority Data

May 1, 1995 [JP] Japan ................................. 7-107462

[51] Int. Cl.$^6$ ............................................. G06F 11/00
[52] U.S. Cl. .................... 395/185.02; 371/21.2; 371/40.13; 395/183.18
[58] Field of Search ................... 395/185.02, 182.03, 395/183.05, 183.18, 185.07; 371/2.2, 21.1, 21.2, 40.1, 40.13; 365/200, 201; 711/102, 103

[56] References Cited

U.S. PATENT DOCUMENTS

| | | | |
|---|---|---|---|
| 4,064,553 | 12/1977 | Kashio | 364/200 |
| 4,442,519 | 4/1984 | Jones et al. | 371/27 |
| 4,954,942 | 9/1990 | Masuda et al. | 364/455 |
| 5,049,874 | 9/1991 | Ishida et al. | 340/825.44 |
| 5,164,918 | 11/1992 | Ogino et al. | 365/201 |
| 5,206,940 | 4/1993 | Murakami et al. | 395/400 |
| 5,249,156 | 9/1993 | Hagiwara et al. | 365/228 |
| 5,257,388 | 10/1993 | Hayamizu | 395/800 |
| 5,398,319 | 3/1995 | Sakamura et al. | 395/375 |
| 5,400,342 | 3/1995 | Matsumura et al. | 371/21.2 |
| 5,404,560 | 4/1995 | Lee et al. | 395/800 |
| 5,557,558 | 9/1996 | Daito | 364/579 |

FOREIGN PATENT DOCUMENTS

64-76348  3/1989  Japan .

*Primary Examiner*—Robert W. Beausoliel, Jr.
*Assistant Examiner*—Dieu-Minh Le
*Attorney, Agent, or Firm*—Young & Thompson

[57] ABSTRACT

An internal ROM of a CPU stores in advance a plurality of check start addresses and a skip value. The internal ROM of a CPU also stores a storing address that is determined from among retrieval addresses obtained by sequentially adding the skip value to the check start address. The external ROM stores a check sum in each storing address, where the check sum is calculated to data in each retrieval address that is determined for each combination of the check start address and the skip value. For checking the external ROM, data of retrieval addresses that are determined with a check start address and a skip value of a selected combination are read and calculated with check sum. Then the calculated check sum and the check sum stored in the storing address are compared. If they are the same each other, the external ROM is decided as normal.

21 Claims, 4 Drawing Sheets

CREATION FLOW FOR ROM DATA

CHECK FLOW FOR EXTERNAL ROM

DATA CHECK METHOD FOR AN EXTERNAL MEMORY AND CHECK SYSTEM FOR AN EXTERNAL ROM DATA

BACKGROUND OF THE INVENTION

1. Field of the Invention

This invention relates to a method of checking Read Only Memory (referred to as ROM, hereinafter) data which is used to check memory errors by checking a ROM memory at system initialization and, more particularly, to a method of checking ROM data enabling greatly reduced check time for the memory making the check method difficult to decode to prevent illegal rewriting.

2. Description of the Related Art

Conventionally, when a system is started by using a ROM, the contents of each memory location in the ROM are read, added to a running total, and compared to a known-good value. This is known as the check sum method.

However, with the advent of ROMs with more than a mega byte of storing becoming readily available, methods such as the check sum method take a considerable time to perform, a resulting in unwanted delays during initialization.

Moreover, as reading and summing all of the data in a ROM is so simple, the ROM check sum is easily decoded. Also illegal rewriting cannot be detected. Such problems have already arisen.

The invention of Japanese Patent Laid-Open No. 76348 (1989) seeks to solve this problem.

This invention provides $2^n$ objective addresses (retrieval addresses) from which data are read, and stores check sum data and the like in the last address. Then memory errors are detected by comparing the check sum data of read data with the check sum data stored in the last address.

As a result, error checking time at system start up is reduced.

However, this invention provides only one way to check the memory, that is, by reading 2n addresses. Also, the check sum data is stored in an obvious place, so the check method and check sum data value are easily determined. As a result, the ROM can be easily rewritten without discovery by the check method.

SUMMARY OF THE INVENTION

It is an object of the present invention to provide solutions for the aforementioned problems.

It is another object of the present invention to reduce the memory check time.

It is still another object of the present invention to prevent illegal rewriting of memory data as well as to be able to find illegally rewritten memory data.

The objects of the present invention are achieved by a method for checking data of an external memory comprising:

a first storing step of storing in advance a check start address for an external memory, a skip value and a storing address for the external memory in an internal memory of a Central Processing Unit (referred to as CPU, hereinafter);

a second storing step of conducting in advance a predetermined calculation to data in retrieval addresses of the external memory that are calculation results of sequentially adding the skip value to the check start address, and storing a result of the predetermined calculation in the storing address of the external memory;

a comparison step of reading data stored in the retrieval addresses of the external memory at checking the external memory, conducting the predetermined calculation to the read data and comparing this calculation result with the calculation result stored in the storing address of the external memory; and a decision step of deciding that the external memory is normal when the calculation result based on the read data coincides with the calculation result stored in the storing address.

Furthermore, the objects of the present invention are achieved by a check system for data stored in an external ROM comprising:

an external ROM in which a calculation result is stored in a predetermined storing address, wherein the calculation result is obtained through a predetermined calculation to data stored in retrieval addresses that are obtained by sequentially adding a check start address to a skip value;

an internal ROM storing the check start address, the skip value and the storing address;

information processing means, having the internal ROM, for reading data stored in the retrieval addresses of the external ROM at checking the external ROM, conducting a predetermined calculation to these read data, comparing this calculation result with the calculation result stored in the storing address, and deciding that data of the external ROM is normal when the both calculation results coincide.

The external ROM is checked by calculating a retrieval address which skips every skip value stored in the internal ROM. As a result, the check time is reduced. Moreover, a check start value and skip value are optional and it is difficult to determine a storing address derived from a check address or the like arbitrarily selected, so the present invention can make the calculation result and check method difficult to be decoded and immediately detect an illegal write from the comparison result.

Two or more retrieval addresses and skip values are stored for selection and a data calculation method for a retrieval address is modified to make a check method and calculation result more difficult to be decoded.

BRIEF DESCRIPTION OF THE DRAWINGS

This and other objects, features and advantages of the present invention will become more apparent upon a reading of the following detailed description and drawings, in which.

DESCRIPTION OF THE PREFERRED EMBODIMENTS

Figure 1:
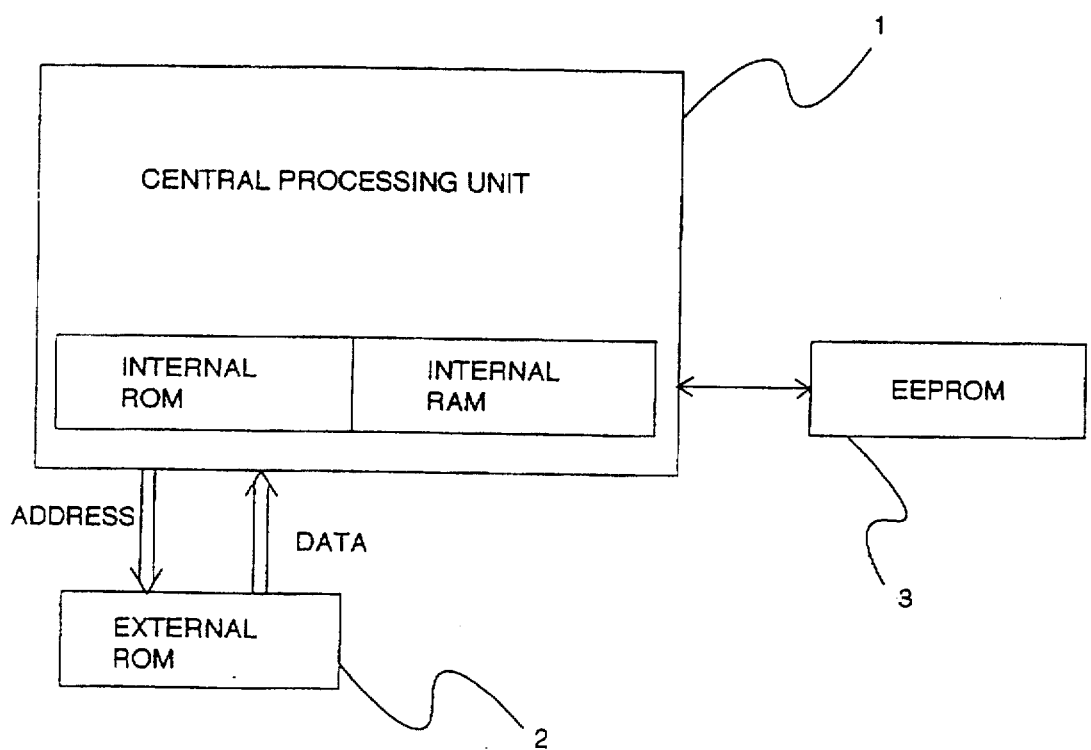
FIG. 1 is a system diagram of an embodiment of a check method of the present invention.

FIG. 1 illustrates an embodiment of the present invention. In this figure, the structure to execute the ROM data check method is shown.

The numeral 1 denotes a Central Processing Unit (referred to as CPU, hereinafter) which contains a ROM to store a check program. 2 denotes an external ROM which stores a main control program to operate the device. 3 denotes an EEPROM (a non-volatile, electrically rewritable memory element) which stores a check result of the external ROM.

Figure 2:
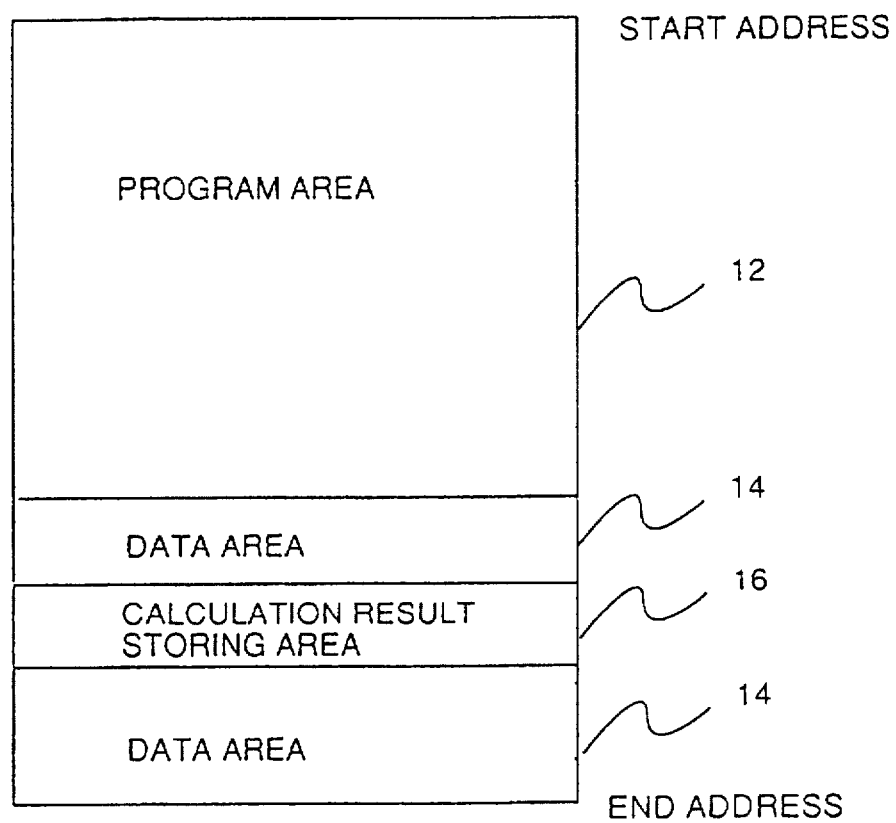
FIG. 2 is a construction view of an external ROM.

FIG. 2 illustrates the data structure of an external ROM 2. As shown in the figure, the internal area of the external ROM 2 is divided into three areas: a program area 12 which stores the main program, a data area 14 which stores each of fixed data, and a calculation result storing area 16 which stores a data calculation result of the external ROM 2.

Next, a way to create and check the data of the external ROM 2 is explained.

First, check start address STAD and skip value C are specified, and retrieval addresses calculated from the check start address and skip value, a calculation result of data of the retrieval addresses and a storing address for the calculation result are determined.

Supposing that a check start address is specified as STADi ("i" is in the range 1 to m) and a skip value is specified as Cb ("b" is in the range 1 to n), address $f_{ib}(x)$ (where the retrieval address is $f_{ib}(x)$) which starts at the check start address STADi and skips at a predetermined skip value C is calculated as follows:

[EXPRESSION 1]

$$f_{ib}(x) = STADi + Cb * x$$

where, x: variable, i: 1 to m, b: 1 to n $f_{ib}(x) \leq$ ROM last address

It is to be noted that if the check start address STADi is 1 and the skip value Cb is 1 all of the addresses of the external ROM 2 are retrieval addresses. However, if the check start address STADi is 1, the skip value is usually 2 or more.

The storing address is set by selecting one address from among the retrieval addresses fib(x). If there are plural check addresses and skip values, one of retrieval addresses acquired for each combination of check start addresses and skip values is specified as a storing address, that is, one storing address is specified for each combination of m check start addresses and n skip values, totally m×n storing addresses.

For example, supposing that check start addresses are specified as two kinds of d and e, skip values are specified as two kinds of j and k,
When
 Storing address for STAD1=d and C1=j is $f_{11}(Q)$,
 Storing address for STAD1=d and C2=k is $f_{12}(R)$,
 Storing address for STAD2=e and C1=j is $f_{21}(T)$,
 Storing address for STAD2=e and C2=k is $f_{22}(U)$,
Then $$f_{11}(Q) = d + j * x_q$$

$$f_{12}(R) = d + k * x_r$$

$$f_{21}(T) = e + j * x_t$$

$$f_{22}(U) = e + k * x_u$$

$f_{11}(Q) \neq f_{12}(R) \neq f_{21}(T) \neq f_{22}(U)$ and $x_q, x_r, x_t, x_u$ are optional.

Therefore, the storing address $f_{11}(Q)$ is on a retrieval route which is specified with the check start address d and the skip value j. The storing address $f_{12}(R)$ is on a retrieval route which is specified with the check start address d and the skip value k. The rest is the same as above.

Like this, the storing address corresponding to a combination of each check start address STADi and the skip value Cb is determined.

The CPU 1 comprises an internal ROM containing each check start address, a skip value and storing addresses corresponding to combinations of each check start address, and the skip value.

Figure 3:
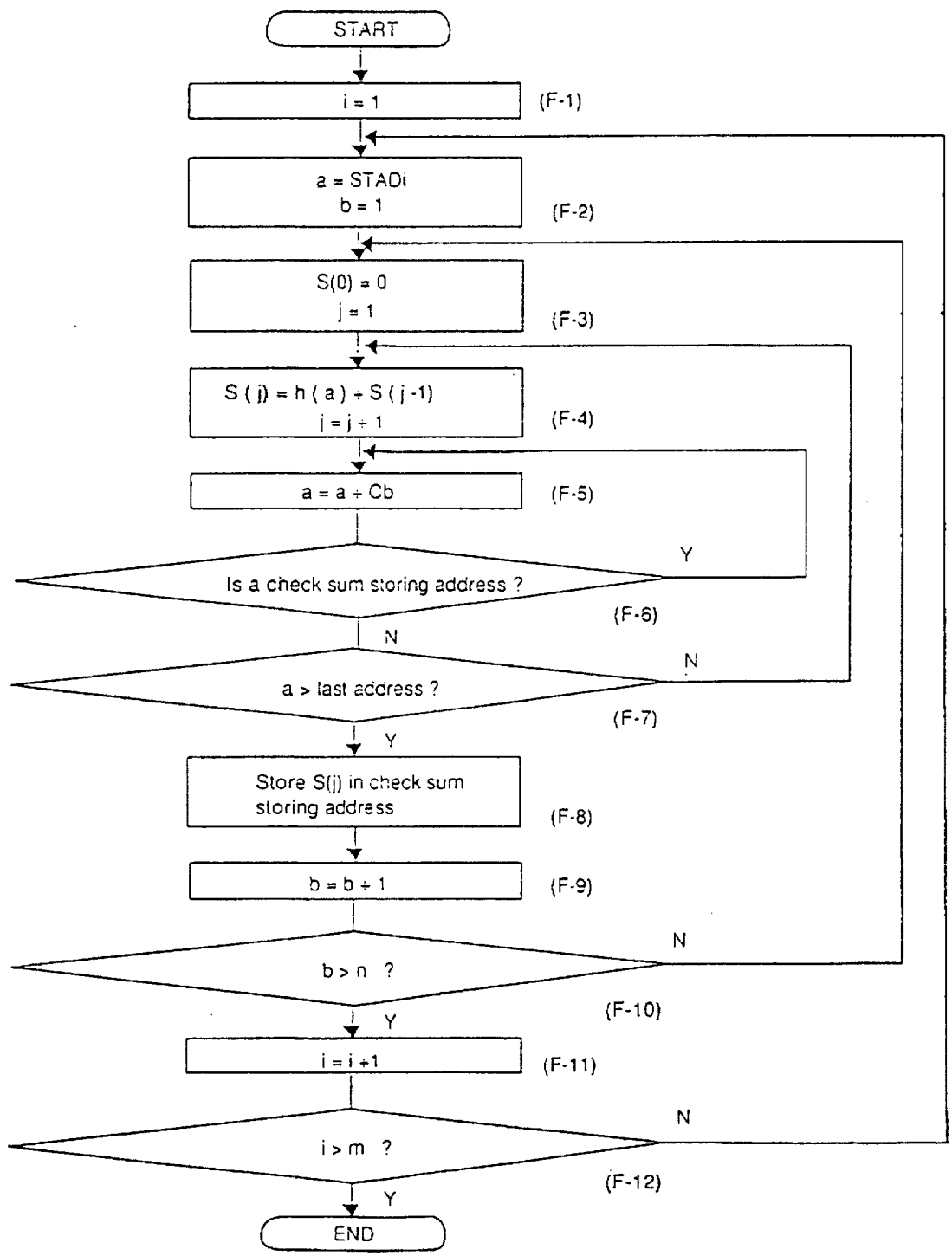
FIG. 3 is a flow chart showing steps to create the external ROM data.

Next, check data for the external ROM 2 is created. A creation flow of check data is shown in FIG. 3.

First, in the above expression 1, i=1 (F-1), a=STAD1, b=1 (F-2), S(0)=0, j=1 are specified (F-3). Second, data h(a) in address a is read and added to S(j-1) or S(0)=0, making the result S(1), and j is incremented by 1 (F-4). Then, a value calculated by adding C1 to a is specified as a (F-5).

It is checked whether the address a incremented by C1 is a storing address (F-6). If it is a storing address, the process returns to (F-5), otherwise it is checked whether the a is the last address (F-7). In (F-7) when not reaching the last address, the process returns to (F-4). When having reached the last address, the process proceeds to (F-8). When returning to (F-4), data in the address following the skipped address is read and S(2) is calculated by adding the value to S(1).

S(j)'s are sequentially calculated as described above, while an address which is applied to a storing address is skipped and data in the next address is added to the address. When a reaches the last address, check sum S(j) is stored in $f_{11}$, a storing address for i=1 and b=1, completing the process where i=1 and b=1 are specified.

Next, b is incremented by 1 (F-9) to check whether b is greater than n (F-10). If not, the process returns to (F3) and the calculation for i=1, b=2 is executed in the same way. When the a reaches the last address, check sum S(j) for i=1, b=2 is stored in the storing address $f_{12}$.

1 is then sequentially added to b until b is greater than n. i is incremented (F-11) and i is checked to determined whether it is greater than m (F-12). If not, the process returns to (F-2), the calculation for b=1 to b=n is executed with i=2 specified in the same way, and each check sum is stored in the storing address.

Here, the program in the program area is also read as a check data.

When i is greater than m, the calculations and their results for all combinations have been stored, completing the process. In this way, the external ROM 2 storing check data is created.

As an application of the above described check data creation method, it is possible to store a result of an exclusive OR operation of the check sum S(j) and an arbitrary code as check data. Here, for the arbitrary code, the code of the CPU is used. By this construction, it makes decoding of the check data difficult and presents illegal writing of data.

Next, a check method for using the external ROM 2 created above in the system in FIG. 1 is explained.

Figure 4:
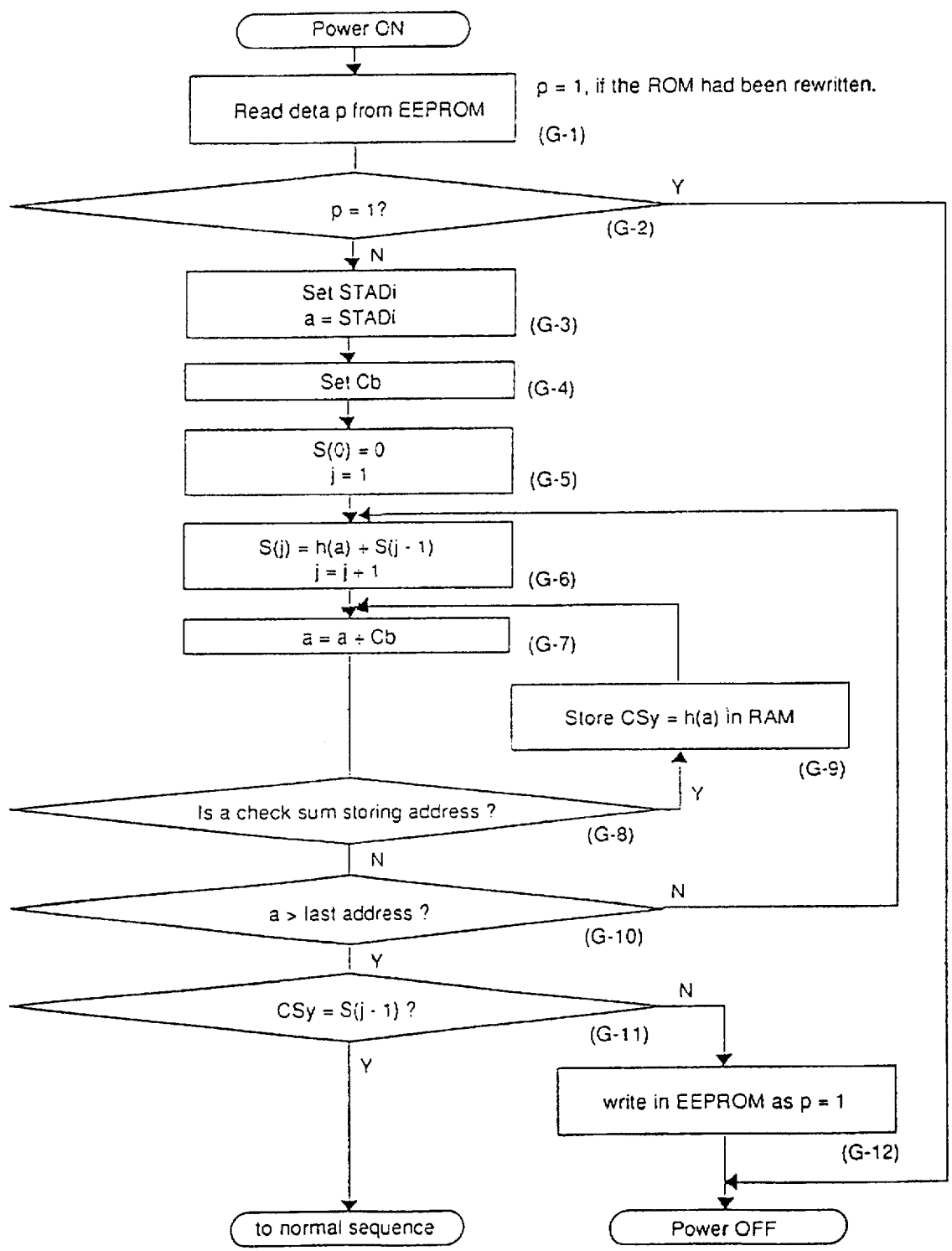
FIG. 4 is a flow chart showing a check method of the external ROM.

The check method is explained using the external ROM check flow in FIG. 4.

First, when the power of the system is turned on, the CPU reads an error flag of an external ROM stored in EEPROM (G-1) to check whether any check sum error occurred. When an error occurred (G-2), the power is automatically turned off to stop the system. If no error has occured, the process proceeds to a checking routine to check the external ROM 2 as follows:

First, a check start address and a skip value are selected at random from among check start addresses STADi's and skip values Cb's stored in the internal ROM to specify values for i and b. a=STADi, S(0)=0, j=1 are specified (G-3), (G-4) and (G-5).

A retrieval address is calculated according to the selected check start address and skip value and the data in the retrieval address is added to S(j) (G-6). The skip value is added to the check start address (G-7). When the retrieval address is applied to a storing address (All check sum storing addresses are stored in the CPU), the process returns to (G-7), and then when a result of check sum which is being calculated is applied to a storing address (after checking the number of storing addresses), the value h(a)=CSy is read and stored in the RAM (G-9). When a exceeds the last address (G-10), the calculation result S(j-1) and the CSy stored in the RAM are compared (G-11). When they are the same, it is considered normal. Then, the process proceeds to an ordinary sequence. When they do not match, p=1 is specified to store 1 in an error flag of the EEPROM and the power is turned off to stop the system.

Therefore, it becomes possible to check the data stored in a retrieval address that is determined by an arbitrarily selected check start address and a skip value. It is possible to check all data by multiple iterations of checking, although all data can not be checked in a single iteration.

For example, if STADi is set to 1 through 3 and the Cb is 3, all data can be checked by the three combinations of the values.

Therefore, as indicated in the embodiment, skipping of retrieving address makes checking time for an external ROM 2 shorter and a illegal rewriting of the external ROM 2 is easily detected. When there are m check start addresses and n skip values, m×n check sum check methods are provided.

As another embodiment, it is possible to construct that reading data h is operated with Exclusive OR using fixed codes to calculate check sum S. This method can also make checking time for an external ROM shorter.

It is to be noted that the program in the program area is also read as a check data. Moreover, it is not necessary that the storing address is on the retrieval route.

In the external ROM data check method of the present invention, a retrieval address is calculated by skipping and the calculation result is stored in the retrieval address and is read, reducing external ROM checking time.

Moreover, because check start addresses and skip values are selected at random, check methods are provided in great numbers and they are difficult to be decoded, surely preventing a ROM from being illegally rewritten and used.

What is claimed is:

1. A method for checking data of an external memory comprising:

a first storing step of storing in advance a check start address for an external memory, a skip value and a storing address for said external memory in an internal memory of a Central Processing Unit (referred to as CPU, hereinafter);

a second storing step of conducting in advance a predetermined calculation to data in retrieval addresses of said external memory that are calculation results of sequentially adding said skip value to said check start address, and storing a result of said predetermined calculation in said storing address of said external memory;

a comparison step of reading data stored in said retrieval addresses of said external memory at checking said external memory, conducting said predetermined calculation to said read data and comparing this calculation result with said calculation result stored in said storing address of said external memory; and a decision step of deciding that said external memory is normal when said calculation result based on said read data coincides with said calculation result stored in said storing address.

2. The method for checking data of an external memory of claim 1, wherein said internal memory and said external memory are Read Only Memories.

3. The method for checking data of an external memory of claim 1, wherein said storing address is selected from among a plurality of said retrieval addresses.

4. The method for checking data of an external memory of claim 1, wherein said predetermined calculation is to calculate a sum of data stored in said retrieval addresses.

5. The method for checking data of an external memory of claim 1, wherein said predetermined calculation is to calculate an exclusive OR of data stored in said retrieval addresses.

6. The method for checking data of an external memory of claim 1, wherein said first storing step is a step of storing in advance a check start address for said external memory and a skip value where at least one of said check start address and said skip value is plural and storing address of said external memory that corresponds to each combination of said check start address and said skip address in an internal memory of said CPU;

said second storing step is a step of conducting, for each combination of said check address and said skip value, a predetermined calculation to data in retrieval addresses of said external memory that are calculation results of sequentially adding said skip value to said check start address, and storing each result of said predetermined calculation in said storing address, which corresponds to said each combination, of said external memory;

said comparison step is a step of selecting an arbitrary combination from among combinations of said check start address and said skip value at checking said external memory, reading data stored in said retrieval addresses, which corresponds to said selected arbitrary combination, from said external memory, conducting said predetermined calculation to said read data and comparing this calculation result with said calculation result stored in said storing address which corresponds to said arbitrarily selected combination.

7. The method for checking data of an external memory of claim 6, wherein said storing address which corresponds to said each combination is selected from among said retrieval addresses of respective combinations.

8. The method for checking data of an external memory of claim 6, wherein said predetermined calculation is to calculate a sum of data stored in respective combinations of said retrieval addresses.

9. The method for checking data of an external memory of claim 6, wherein said predetermined calculation is to calculate an exclusive OR of data stored in said retrieval addresses.

10. A method for checking data of an external Read Only Memories (referred to as ROM, hereinafter) comprising steps of:

storing in advance a check start address for said external ROM and a skip value where at least one of said check start address and said skip value is plural and a plurality of storing addresses of said external ROM that are selected from among retrieval addresses obtained by sequentially adding a check start address to a skip value for each combination of said check start address and said skip address, in an internal ROM of a CPU;

calculating, for each combination of said check address and said skip value, a sum of data stored in said retrieval addresses, and storing each sum in said storing address which corresponds to said each combination;

selecting an arbitrary combination from among said combinations of said check start address and said skip value stored in said internal ROM at checking said external ROM, reading data stored in said retrieval addresses which correspond to said selected arbitrary combination from said external ROM, calculating a sum of read data, and comparing this calculation result with said sum stored in said storing address which corresponds to said selected combination; and deciding that data of said external ROM is normal when a sum of said read data coincides with a sum stored in said storing address.

11. The method for checking data of an external ROM of claim 10, comprising a step of calculating an exclusive OR of data stored in said retrieval addresses, instead of calculating a sum of data stored in said retrieval addresses.

12. A check system for data stored in an external ROM comprising:

an external ROM in which a calculation result is stored in a predetermined storing address, wherein said calculation result is obtained through a predetermined calculation to data stored in retrieval addresses that are obtained by sequentially adding a check start address to a skip value;

an internal ROM storing said check start address, said skip value and said storing address;

information processing means, having said internal ROM, for reading data stored in said retrieval addresses of said external ROM at checking said external ROM, conducting a predetermined calculation to these read data, comparing this calculation result with said calculation result stored in said storing address, and deciding that data of said external ROM is normal when the both calculation results coincide.

13. The check system for data stored in an external ROM of claim 12, wherein said storing address is selected from among a plurality of said retrieval addresses.

14. The check system for data stored in an external ROM of claim 12, wherein said predetermined calculation is to calculate a sum of data stored in said retrieval addresses.

15. The check system for data stored in an external ROM of claim 12, wherein said predetermined calculation is to calculate an exclusive OR of data stored in said retrieval addresses.

16. The check system for data stored in an external ROM of claim 12, further comprising a memory for storing a decision result of said information processing means.

17. A check system for data stored in an external ROM comprising:

an internal ROM storing a check start address and a skip value where at least one of said check start address and said skip value is plural and a plurality of storing addresses that correspond respective combinations of said check start address and said skip address;

an external ROM in which a calculation result obtained through a predetermined calculation to data stored in retrieval addresses obtained by sequentially adding a check start address to a skip value for each combination of said check start address and said skip address, in said storing address that corresponds to each combination; and information processing means, having said internal ROM, at checking said external ROM, for selecting an arbitrary combination from among said combinations of said check start address and said skip address, reading data stored in said retrieval addresses corresponding to said arbitrarily selected combination from said external ROM, conducting a predetermined calculation to these read data, comparing this calculation result with said calculation result stored in said storing address, and deciding that data of said external ROM is normal when the both calculation results coincide.

18. The check system for data stored in an external ROM of claim 17, wherein said storing address is selected from among a plurality of said retrieval addresses of corresponding combinations.

19. The check system for data stored in an external ROM of claim 17, wherein said predetermined calculation is to calculate a sum of data stored in said retrieval addresses.

20. The check system for data stored in an external ROM of claim 17, wherein said predetermined calculation is to calculate an exclusive OR of data stored in said retrieval addresses.

21. The check system for data stored in an external ROM of claim 17, further comprising a memory for storing a decision result of said information processing means.

* * * * *